United States Patent
Ishikzuka

[11] Patent Number: 5,903,821
[45] Date of Patent: May 11, 1999

[54] PORTABLE TELEPHONE WITH MICROSTRIP ANTENNAS

[75] Inventor: Seijiro Ishikzuka, Tokyo, Japan

[73] Assignee: Sony Corporation, Tokyo, Japan

[21] Appl. No.: 08/679,854

[22] Filed: Jul. 15, 1996

[30] Foreign Application Priority Data

Jul. 13, 1995 [JP] Japan ................................ 7-177576

[51] Int. Cl.[6] .................................................. H04B 1/44
[52] U.S. Cl. ............................ 455/83; 455/90; 455/277.1
[58] Field of Search ........................ 455/62, 67.1, 226.1, 455/226.2, 277.1, 277.2, 95, 550, 575, 78, 82, 83; 343/700 MS, 702, 876

[56] References Cited

U.S. PATENT DOCUMENTS

| | | |
|---|---|---|
| 4,829,591 | 5/1989 | Hashimoto et al. ................... 455/575 |
| 4,914,714 | 4/1990 | Tamura ..................................... 455/78 |
| 5,203,018 | 4/1993 | Hirose ..................................... 455/101 |
| 5,471,146 | 11/1995 | Krayeski et al. ..................... 455/226.1 |
| 5,495,255 | 2/1996 | Komatsu et al. ......................... 455/73 |
| 5,559,838 | 9/1996 | Nakagoshi ............................. 455/377.1 |
| 5,634,200 | 5/1997 | Kitakubo et al. ......................... 455/83 |

*Primary Examiner*—Edward F. Urban
*Attorney, Agent, or Firm*—Jay H. Maioli

[57] ABSTRACT

In a portable telephone, a pair of microstrip antennas (1), (2) for signal reception and signal transmission with adjacent resonance frequencies different from each other are approximately arranged on the same plane at predetermined intervals. Accordingly, in the portable telephone, neither antenna becomes a hindrance when storing the portable telephone into a pocket of a coat, etc., and it is not necessary to operate the antenna at a signal receiving time, during calling time or after the operator is finished using the portable telephone.

2 Claims, 5 Drawing Sheets

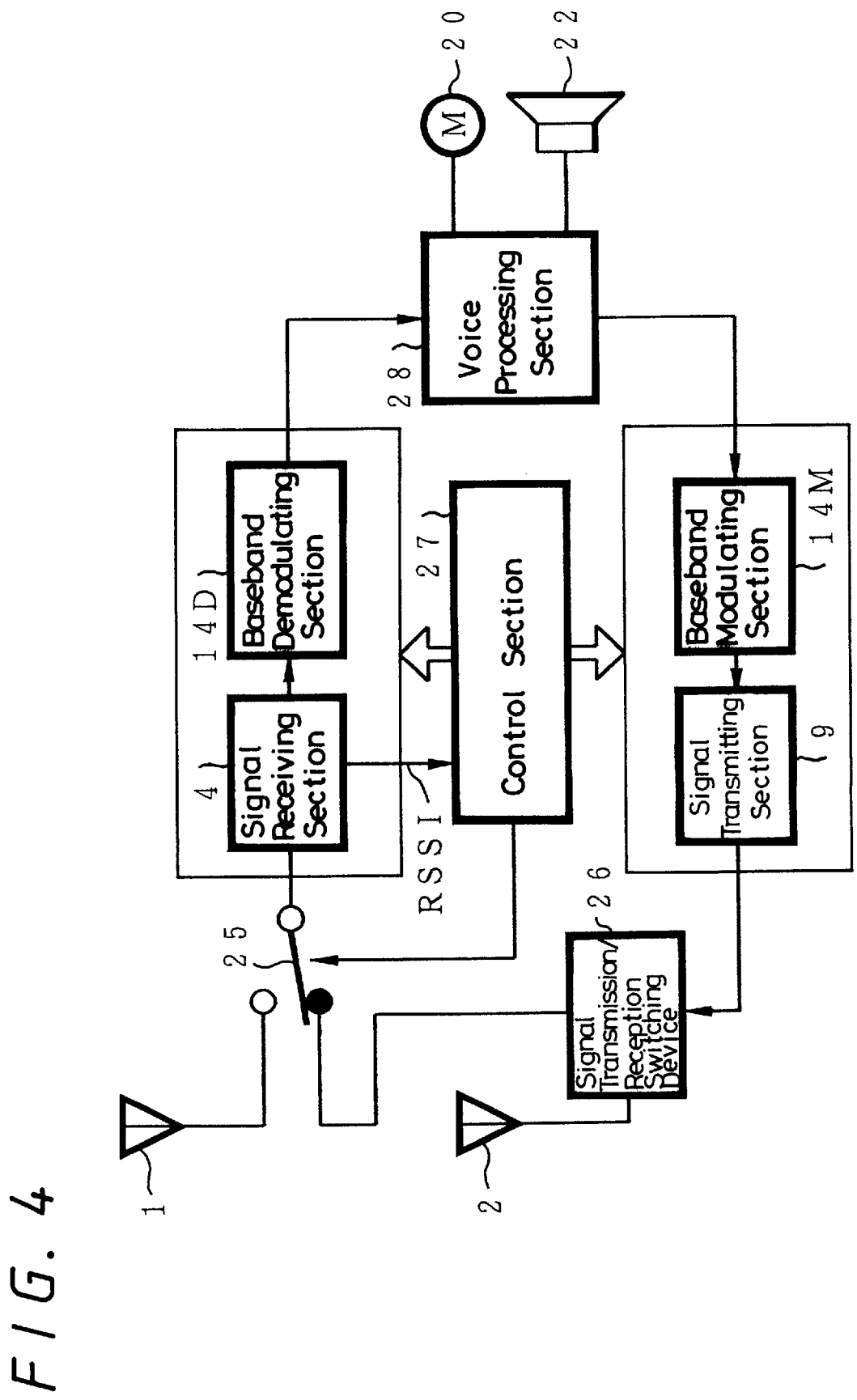
F I G. 4

PORTABLE TELEPHONE WITH MICROSTRIP ANTENNAS

BACKGROUND OF THE INVENTION

The present invention relates to a portable telephone.

In a conventional portable telephone, a microstrip antenna is used as a dedicated antenna for receiving a signal. An external whip antenna having wide frequency band characteristics is used as a signal transmitting antenna. Such a technique is known.

Such a conventional portable telephone has the external whip antenna. Therefore, when the portable telephone is stored into a pocket of a coat, etc., this external whip antenna becomes a hindrance. Further, it is troublesome to extend the external whip antenna at a signal reaching time and a calling time and shorten this external whip antenna after an operator speaks by telephone.

SUMMARY OF THE INVENTION

In view of the above conventional problems, it is a main object of the present invention to provide a portable telephone in which an antenna does not become a hindrance when storing the portable telephone into a pocket of a coat, etc., and it is not necessary to extend the antenna at a signal reaching time and a calling time and shorten the antenna after an operator speaks by telephone.

It is another object of the present invention to provide a portable telephone in which two antennas are switched and connected to a signal transmitting section and a signal receiving section so that normal signal reception and transmission and diversity signal reception are enabled by using these two antennas.

It is another object of the present invention to provide a portable telephone having a switch circuit in which two antennas are switched and connected to a signal transmitting section and a signal receiving section so that normal signal reception and transmission and diversity signal reception are enabled.

In the present invention, the above objects can be achieved by a portable telephone comprising microstrip antennas for signal reception and signal transmission having adjacent resonance frequencies different from each other and approximately arranged on the same plane at a predetermined interval.

In the present invention, the above objects can be also achieved by a portable telephone comprising microstrip antennas for signal reception and signal transmission having adjacent resonance frequencies different from each other and approximately arranged on the same plane at a predetermined interval; the portable telephone being constructed such that the first microstrip antenna is connected to a signal receiving section at a signal receiving time; the second microstrip antenna is connected to a signal transmitting section at a signal transmitting time; and the first and second microstrip antennas are selectively connected to the signal receiving section at a diversity signal receiving time.

In the present invention, the above objects can be further achieved by a portable telephone comprising microstrip antennas for signal reception and signal transmission having adjacent resonance frequencies different from each other and approximately arranged on the same plane at a predetermined interval; the portable telephone being constructed such that the first microstrip antenna is connected to a signal receiving section at a signal receiving time; the second microstrip antenna is connected to a signal transmitting section at a signal transmitting time; and the first and second microstrip antennas are connected to first and second signal receiving sections constituting the signal receiving section at a diversity signal receiving time, and outputs of the first and second signal receiving sections are selectively switched.

In accordance with each of these portable telephones, the antenna for signal transmission is also a microstrip antenna in addition to the antenna for signal reception. Accordingly, no antenna becomes a hindrance in storing of the portable telephone into a pocket of a coat, etc., and it is not necessary to extend the antenna at a signal reaching time and a calling time and shorten the antenna after an operator speaks by telephone.

BRIEF DESCRIPTION OF THE DRAWINGS

FIG. 4 is a block diagram showing a second embodiment of the present invention;

DETAILED DESCRIPTION OF THE PREFERRED EMBODIMENTS

Figure 1:
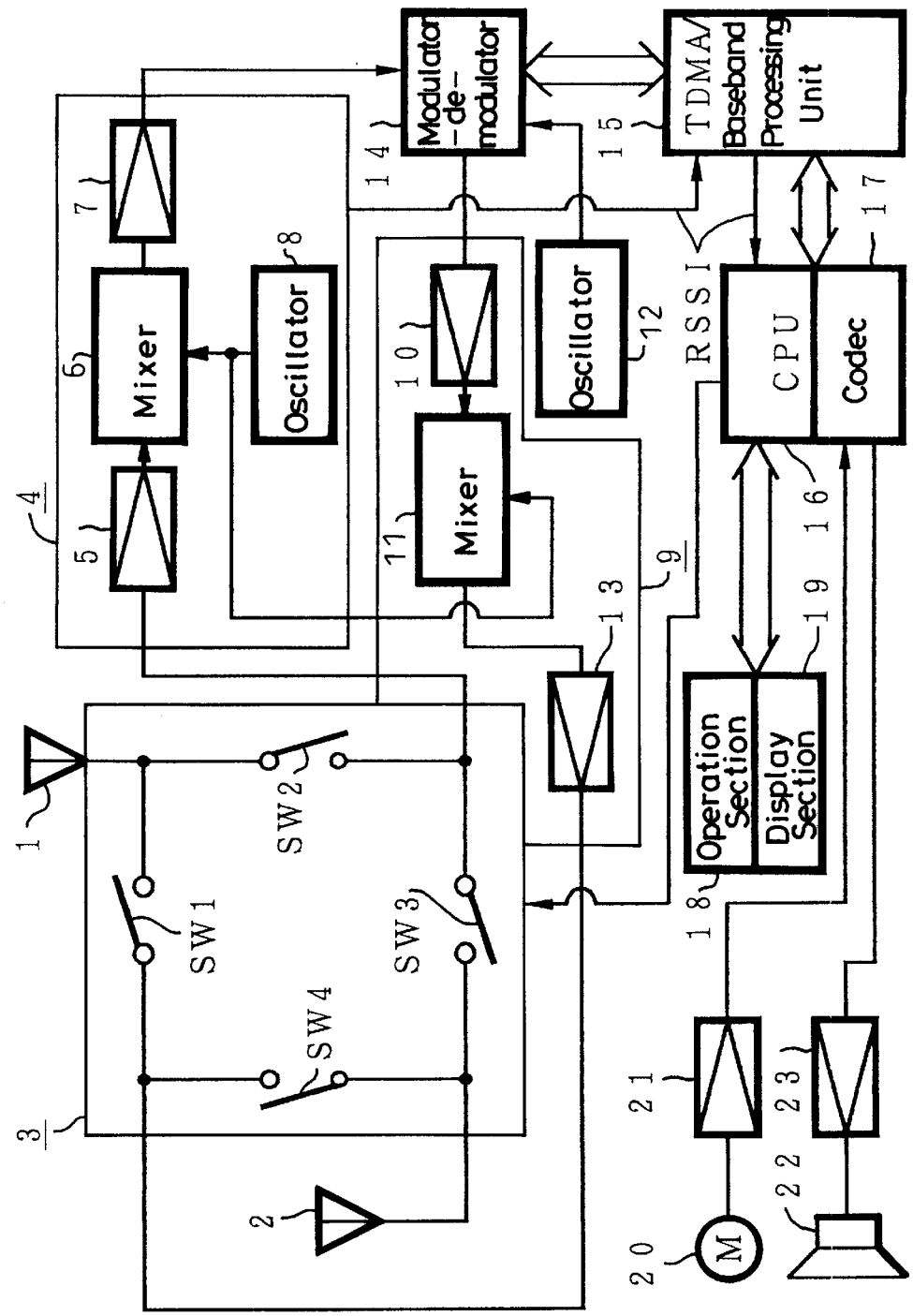
FIG. 1 is a block diagram showing a first embodiment of the present invention.
Figure 2:
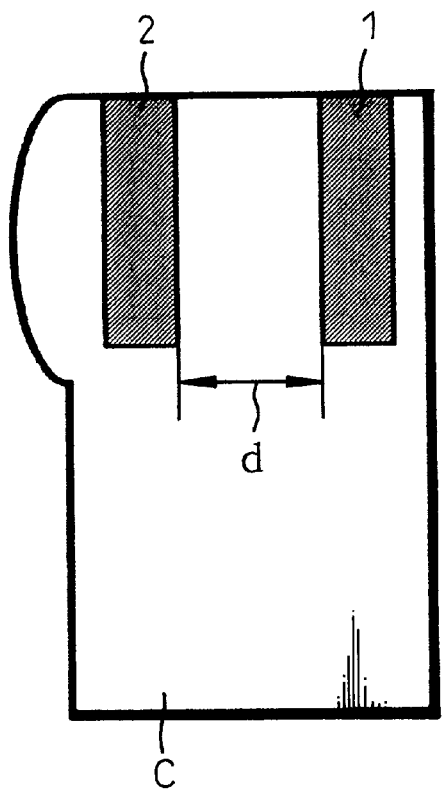
FIG. 2 is a schematic diagram showing an antenna according to the first embodiment.

A portable telephone in accordance with a first embodiment of the present invention will next be described with reference to the drawings. First, a circuit of this portable telephone (here, for example, the portable telephone of a digital system used in frequency bands of 800 MHz, 1.5 GHz, etc.) will be explained with reference to FIG. 1. Microstrip antennas (reverse F-antennas) 1 and 2 have adjacent resonance frequencies different from each other. As shown in FIG. 2, the microstrip antennas 1 and 2 are arranged at a predetermined interval in the approximately same plane of an unillustrated dielectric substrate on the inner side of a case C of the portable telephone. Each of the microstrip antennas 1 and 2 has a rectangular shape, but may be formed in a circular shape. A resonance frequency f of these rectangular microstrip antennas is represented by the following formula.

$$f = c/(2b\epsilon_r^{1/2})$$

Here, c is the light velocity, b is a length between magnetic flows (a length in the extending direction of a power supplying line of each of the microstrip antennas when the power supplying line is guided from each of the rectangular microstrip antennas vertically to one side thereof), and $\epsilon_r$ is the dielectric constant of a dielectric substance.

Each of such microstrip antennas 1 and 2 has a directivity direction perpendicular to a face thereof. A signal transmitting and receiving band of each of the microstrip antennas 1 and 2 is considerably narrow in comparison with a whip antenna. Accordingly, when each of the microstrip antennas 1 and 2 is used as a diversity antenna, it is necessary to set resonance frequencies of the microstrip antennas 1 and 2 to be considerably close to each other.

When a longer one of resonance wavelengths of the microstrip antennas 1 and 2 is set to $\lambda$, the interval d between the microstrip antennas 1 and 2 satisfies $d > \lambda/4$ and is desirably set to be as long as possible.

The microstrip antenna 1 is normally used as a signal receiving antenna (a dedicated antenna for only receiving a signal) and the microstrip antenna 2 is used as a signal transmitting antenna. When the microstrip antennas 1 and 2 are used as diversity antennas, both the microstrip antennas become signal receiving antennas.

A switch circuit 3 is constructed such that on-off switches SW1 to SW4 are sequentially inserted in the clockwise direction on respective sides of the lead wire of a polygon having an even number of sides, here, on respective sides of the lead wire of a square. The signal receiving antenna 1 is connected to a connection middle point of switches SW1 and SW2 of this switch circuit 3. The signal transmitting antenna 2 is connected to a connection middle point of switches SW3 and SW4. A connection middle point of switches SW2 and SW3 of the switch circuit 3 is connected to the input side of a signal receiving section 4. A connection middle point of switches SW4 and SW1 is connected to the output side of a signal transmitting section 9.

The signal receiving section 4 is constructed by a high frequency amplifier 5, a mixer 6, a local oscillator 8 and an intermediate frequency amplifier 7. The connection middle point of the switches SW2 and SW3 is connected to an input side of the high frequency amplifier 5. An output side of this amplifier 5 is connected to the mixer 6. The local oscillator 8 supplies a local oscillating signal to this mixer 6. An intermediate frequency signal is supplied from the mixer 6 to the intermediate frequency amplifier 7. The intermediate frequency signal from this amplifier 7 is supplied to a demodulating portion of a modulator-demodulator 14 and is demodulated.

The signal transmitting section 9 is constructed by an intermediate frequency amplifier 10, a mixer 11, the local oscillator 8 and a high frequency amplifier 13. A carrier wave signal is supplied from an oscillator 12 to the modulator-demodulator 14. A modulated signal from a modulating portion of the modulator-demodulator 14 is supplied to the intermediate frequency amplifier 10. An intermediate frequency signal from this amplifier 10 is supplied to the mixer 11. The local oscillator 8 is commonly used in the signal receiving section 4 and supplies a local oscillating signal to this mixer 11. The high frequency amplifier 13 amplifies a high frequency signal from the mixer 11. The high frequency signal from this amplifier 13 is supplied to the connection middle point of the switches SW4 and SW1 of the switch circuit 3.

A voice signal from a transmitter (a microphone) 20 is supplied to an amplifier 21 and is amplified by this amplifier 21. Thereafter, the voice signal is supplied to a codec 17 and is digitally coded by this codec. The coded voice signal from the codec 17 is supplied to a TDMA (time division multiple access)/baseband processing section 15 and is compressed and converted to a signal of a time division multiple access system. This signal is supplied to the modulator-demodulator 14 and is modulated. This modulated signal is supplied to the connection middle point of the switches SW4 and SW1 of the switch circuit 3 through the signal transmitting section 9. This modulated signal (a high frequency signal) is supplied to the signal transmitting antenna 2 through the switch SW4 turned on and is transmitted.

The signal receiving signal from the signal receiving antenna 1 or each of the signal receiving antennas 1 and 2 is respectively supplied to the signal receiving section 4 through the switch SW2 or each of the switches SW2 and SW3 and is received. This receiving signal (a high frequency signal) is supplied to the modulator-demodulator 14 and is demodulated. Thereafter, this receiving signal is supplied to the TDMA/baseband processing section 15 and is converted to a coded voice signal. This coded voice signal is supplied to the codec 17 and is decoded. The obtained voice signal is supplied to a transmitter (a speaker) 22 through an amplifier 23.

A CPU 16 controls the operations of respective portions of the portable telephone. An input signal from an operation section 18 (having a ten key, a "*" key, a "#" key, a shortening key, a redial key, etc.) is supplied to this CPU 16. A display signal from the CPU 16 is supplied to a display section 19 such as a liquid crystal display, etc. so that a called telephone number, etc. is displayed.

Figure 3:
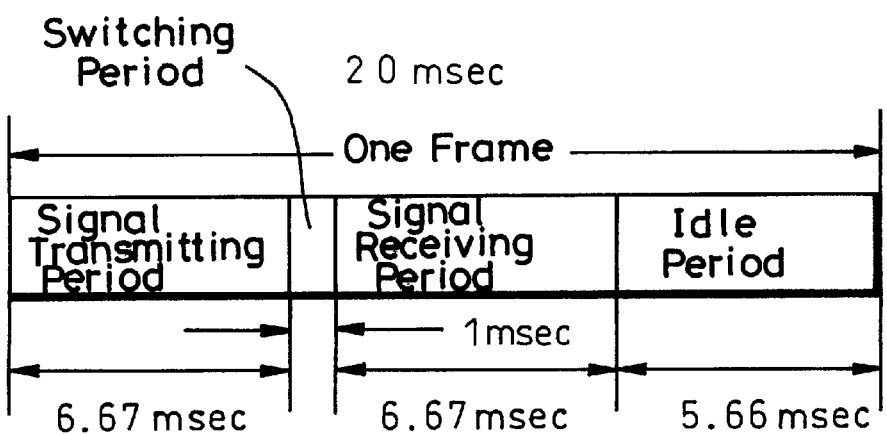
FIG. 3 is a view showing a slot arrangement of signal transmission and reception.

For example, an RSSI (received signal strength indicator) signal showing the strength of a receiving signal is obtained from the signal receiving section 4 by amplifying detection of a high frequency receiving signal although this construction is not illustrated. This RSSI signal is supplied to the CPU 16 through the TDMA/baseband processing section 15. The CPU 16 controls turning-on and turning-off operations of the respective switches SW1 to SW4 of the switch circuit 3. FIG. 3 shows a slot arrangement of one frame of signal reception and transmission of a digital telephone. One frame of 20 msec is constructed by a signal transmitting period of 6.67 msec, a switching period of 1 msec, a signal receiving period of 6.67 msec and an idle period of 5.66 msec.

An operation of this portable telephone will next be explained. In the signal transmitting period, the switch SW4 is turned on and the remaining switches SW1 to SW3 are turned off by control of the switch circuit 3 using the CPU 16, and the signal transmitting antenna 2 is connected to the output side of the amplifier 13 of the signal transmitting section 9. In the normal signal receiving period, the switch SW2 is turned on and the remaining switches SW1, SW3 and SW4 are turned off by the control of the switch circuit 3 using the CPU 16, and the signal receiving antenna 1 is connected to the input side of the amplifier 5 of the signal receiving section 4. At a diversity signal receiving time, the antennas 1 and 2 are used as signal receiving antennas and the switches SW2 and SW3 are separately turned on in a state in which the switches SW1 and SW4 are turned off in a switching period by the control of the switch circuit 3 using the CPU 16. The strengths of receiving signals provided by RSSI signals at the turning-on time of each of the switches SW2 and SW3 are compared with each other by the CPU 16. In the next signal receiving period, the switch SW2 or SW3 on one side of the antennas 1 and 2 having a higher strength of the receiving signals is turned on and this antenna is connected to the input side of the amplifier 5 of the signal receiving section 4.

A circuit of a portable telephone in accordance with a second embodiment of the present invention will next be described with reference to FIG. 4. Similar to the portable telephone of FIG. 1, this portable telephone is a portable telephone of a digital system used in frequency bands of 800 MHz, 1.5 GHz, etc. In FIG. 4, constructional portions corresponding to those in FIG. 1 are designated by the same reference numerals and will be explained.

Reference numerals 1 and 2 respectively designate microstrip antennas for receiving and transmitting a signal. These microstrip antennas 1 and 2 are similar to those explained in the first embodiment form shown in FIG. 1. Reference numerals 25 and 26 respectively designate a change-over switch and a signal transmission/reception switching device (a duplexer). The signal receiving antenna 1 is connected to the input side of a signal receiving section 4 through the change-over switch 25. The signal transmitting antenna 2 is connected to the output side of a signal transmitting section 9 through the signal transmission/reception switching device 26. The signal transmitting antenna 2 is also connected to the input side of the signal receiving section 4 through the signal transmission/reception switching device 26 and the change-over switch 25.

A receiving signal (a modulated voice signal) from the signal receiving section 4 is supplied to a baseband demodulating section 14D and is demodulated. The demodulated voice signal is supplied to a receiver (a speaker) 22 through a voice processing section 28. A voice signal from a transmitter (a microphone) 20 is supplied to a baseband modulating section 14M and is modulated. This modulated voice signal is supplied to the signal transmitting antenna 2 through the signal transmitting section 9 and the signal transmission/reception switching device 26.

A control section 27 (including a CPU) controls operations of the signal receiving section 4, the baseband demodulating section 14D, the signal transmitting section 9, the baseband modulating section 14M and the change-over switch 25. An RSSI signal showing the strength of a receiving signal from the signal receiving section 4 is supplied to the control section 27.

Figure 5:
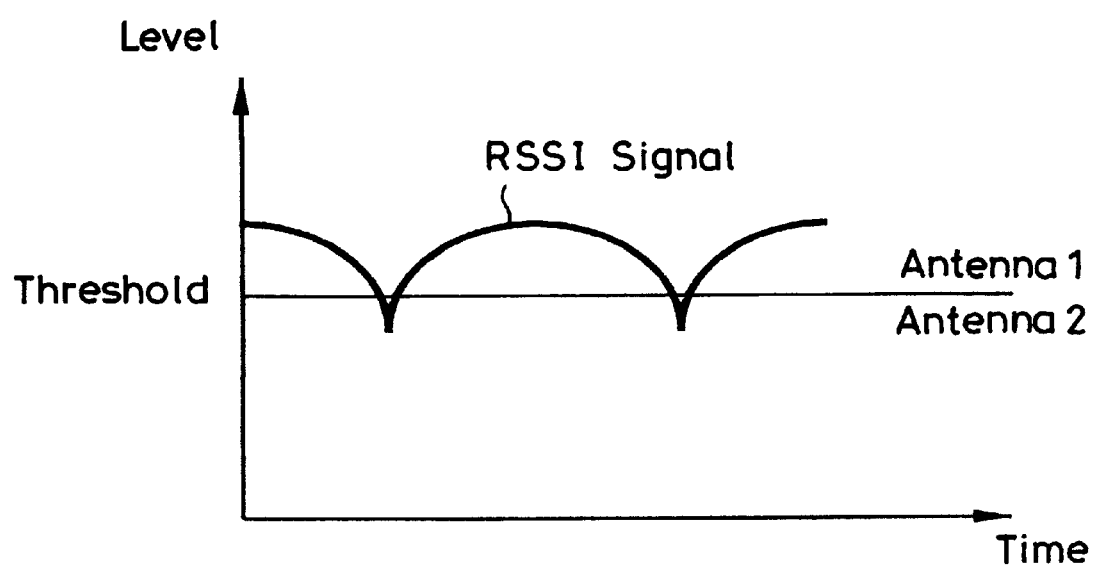
FIG. 5 is a waveform diagram of an RSSI signal.

An operation of this portable telephone will next be described. In a signal transmitting period, a transmitting signal from the transmitter 9 is supplied to the signal transmitting antenna 2 through the signal transmission/reception switching device 26 and is transmitted. In a normal signal receiving period, the change-over switch 25 is switched onto a side of the signal receiving antenna 1 by control of the control section 27, and a receiving signal from the signal receiving antenna 1 is supplied to the signal receiving section 4 through the change-over switch 25. At a diversity signal receiving time, when the signal receiving antenna 1 is connected to the input side of the signal receiving section 4 through the change-over switch 25 in a switching period, the control section 27 judges whether or not the voltage level of an RSSI signal showing a strength of the receiving signal supplied from the signal receiving section 4 to the control section 27 is equal to or greater than a threshold level as shown in FIG. 5. When this voltage level of the RSSI signal is equal to or greater than the threshold level, a switching state of the change-over switch 25 onto a side of the antenna 1 suitable for signal reception is maintained by the control of the control section 27. In contrast to this, when the voltage level of the RSSI signal is smaller than the threshold level, the change-over switch 25 is switched onto a side of the signal transmitting antenna 2, i.e., onto a side of the signal transmission/reception switching device 26 and the signal transmitting antenna 2 is used as a signal receiving antenna.

Figure 6:
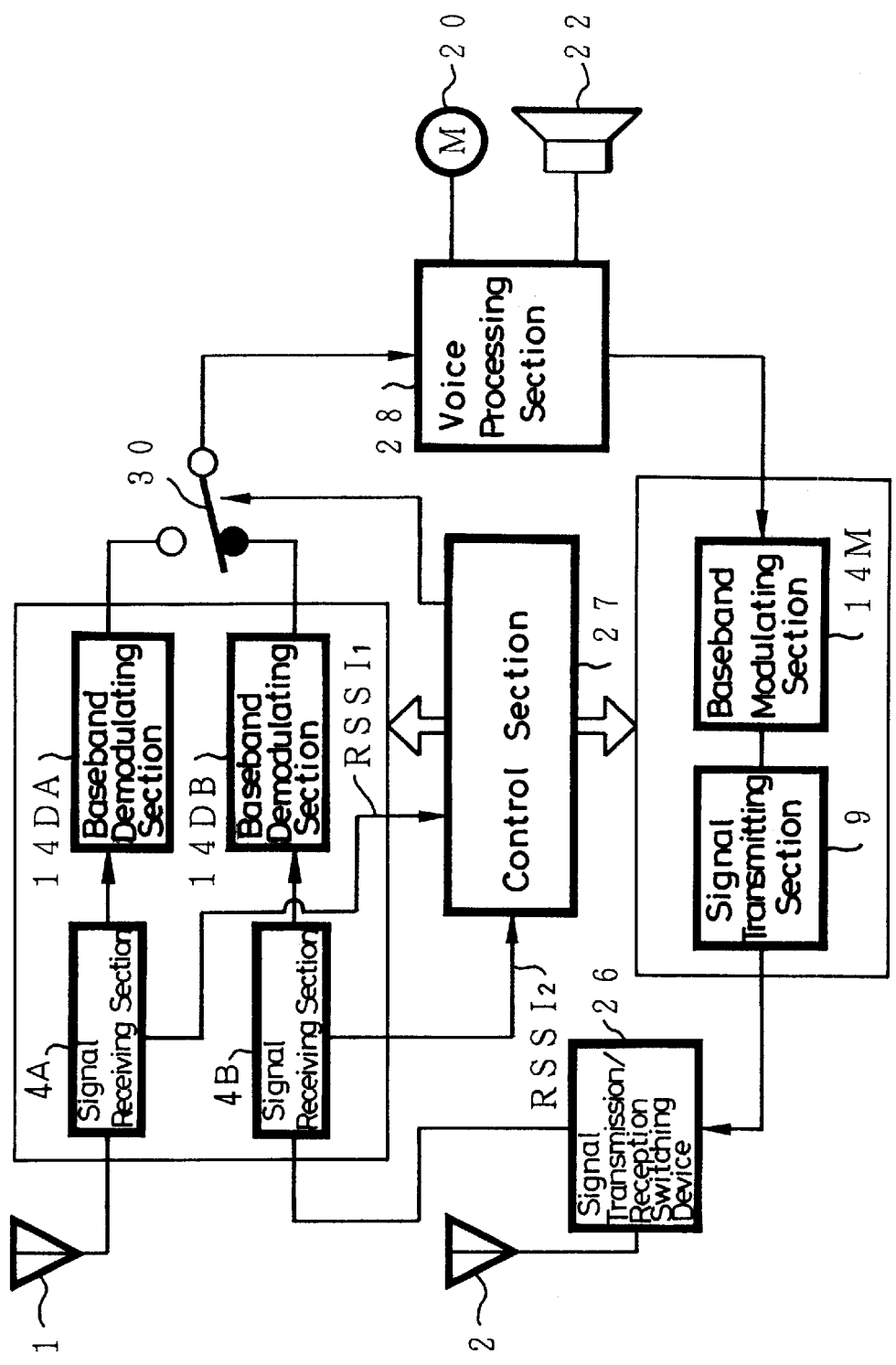
FIG. 6 is a block diagram showing a third embodiment of the present invention.

A circuit of a portable telephone in accordance with a third embodiment form of the present invention will next be described with reference to FIG. 6. Similar to the portable telephone of FIG. 1, this portable telephone is a portable telephone of a digital system used in frequency bands of 800 MHz, 1.5 GHz, etc. In FIG. 6, constructional portions similar to those in FIGS. 1 and 4 are designated by the same reference numerals and will be explained.

Reference numerals 1 and 2 respectively designate microstrip antennas for receiving and transmitting a signal. The microstrip antennas 1 and 2 are similar to those explained in the first embodiment form of FIG. 1. In FIG. 6, reference numerals 26 and 30 respectively designate a signal transmission/reception switching device (a duplexer) and a change-over switch. Here, the portable telephone has two signal receiving sections 4A, 4B and two baseband demodulating sections 14DA, 14DB to which receiving signals of the two signal receiving sections 4A, 4B are respectively supplied. Voice signals obtained by these baseband demodulating sections 14DA and 14DB are switched by the change-over switch 30 and are supplied to a voice processing section 28. The signal receiving antenna 1 is connected to an input side of the signal receiving section 4A. The signal transmitting antenna 2 is connected to the output side of a signal transmitting section 9 through the signal transmission/reception switching device 26. When the signal transmitting antenna 2 is used as a signal receiving antenna, the signal transmitting antenna 2 is connected to an input side of the signal receiving section 4B through the signal transmission/reception switching device 26.

The receiving signals (modulated voice signals) from the signal receiving sections 4A, 4B are respectively supplied to the baseband demodulating sections 14DA, 14DB and are demodulated. One of the demodulated voice signals is supplied to a receiver (a speaker) 22 through the change-over switch 30 and the voice processing section 28. A voice signal from a transmitter (a microphone) 20 is supplied to a baseband modulating section 14M and is modulated. This modulated voice signal is supplied to the signal transmitting antenna 2 through the signal transmitting section 9 and the signal transmission/reception switching device 26.

A control section 27 (including a CPU) controls operations of the signal receiving sections 4A, 4B, the baseband demodulating sections 14DA, 14DB, the signal transmitting section 9, the baseband modulating section 14M and the change-over switch 30. $RSSI_1$ and $RSSI_2$ signals showing strengths of the receiving signals from the signal receiving sections 4A and 4B are supplied to the control section 27.

An operation of this portable telephone will next be described. In a signal transmitting period, a transmitting signal from the signal transmitting section 9 is supplied to the signal transmitting antenna 2 through the signal transmission/reception switching device 26 and is transmitted. In a normal signal receiving period, the change-over switch 30 is switched to a side of the baseband demodulating section 14DA by control of the control section 27, and a receiving signal from the signal receiving antenna 1 is supplied to the baseband demodulating section 14DA through the signal receiving section 4A and is demodulated. A voice signal from the baseband demodulating section 14DA is supplied to the receiver (the speaker) 22 through the voice processing section 28. At a diversity signal receiving time, the antennas 1 and 2 are used as signal receiving antennas. In a switching period, the control section 27 compares the voltage levels of $RSSI_1$ and $RSSI_2$ signals showing strengths of the receiving signals from the signal receiving sections 4A and 4B based on the receiving signals from the antennas 1 and 2. The change-over switch 30 is switched onto a baseband demodulator side on an antenna side showing a higher strength of the receiving signals by control of the control section 27.

In the above embodiment forms, the present invention is applied to the portable telephone of a digital telephone system, but can be also applied to the portable telephone of an analog telephone system.

In accordance with the present invention, microstrip antennas for signal reception and signal transmission have adjacent resonance frequencies different from each other and are approximately arranged on the same plane at a predetermined interval. Accordingly, it is possible to obtain a portable telephone in an antenna does not become a hindrance in storing of the portable telephone into a pocket of a coat, etc., and it is not necessary to extend the antenna at a signal reaching time and a calling time and shorten the antenna after an operator speaks by telephone.

In accordance with the present invention, a portable telephone comprises microstrip antennas for signal reception and signal transmission having adjacent resonance frequencies different from each other and approximately arranged on the same plane at a predetermined interval; and a switch circuit arranged between the first microstrip antenna, the second microstrip antenna, a signal receiving section and a signal transmitting section such that the first microstrip antenna is connected to the signal receiving section at a signal receiving time, and the second microstrip antenna is connected to the signal transmitting section at a signal transmitting time, and the first and second microstrip antennas are selectively connected to the signal receiving section at a diversity signal receiving time. Accordingly, it is possible to obtain a portable telephone in which no antenna becomes a hindrance in storing of the portable telephone into a pocket of a coat, etc., and it is not necessary to extend the antenna at a signal reaching time and a calling time and shorten the antenna after an operator speaks by telephone. Further, in this portable telephone, the two antennas are switched and connected to the signal transmitting section and the signal receiving section so that normal signal reception and transmission and diversity signal reception are enabled by using these two antennas.

In accordance with the present invention, a portable telephone comprises microstrip antennas for signal reception and signal transmission having adjacent resonance frequencies different from each other and approximately arranged on the same plane at a predetermined interval; and a switch circuit arranged between the first microstrip antenna, the second microstrip antenna, a signal receiving section and a signal transmitting section such that the first microstrip antenna is connected to the signal receiving section at a signal receiving time, and the second microstrip antenna is connected to the signal transmitting section at a signal transmitting time, and the first and second microstrip antennas are selectively connected to the signal receiving section at a diversity signal receiving time. This switch circuit is constructed such that switches are inserted onto respective sides of the lead wire of a polygon having an even number of sides; and the first and second microstrip antennas are switched by controlling turning-on and turning-off operations of the respective switches of the switch circuit. Accordingly, it is possible to obtain a portable telephone having a switch circuit in which no antenna becomes a hindrance in storing of the portable telephone into a pocket of a coat, etc., and it is not necessary to extend the antenna at a signal reaching time and a calling time and shorten the antenna after an operator speaks by telephone. Further, in this portable telephone, the two antennas are switched and connected to the signal transmitting section and the signal receiving section so that normal signal reception and transmission and diversity signal reception are enabled by using these two antennas.

In accordance with the present invention, a portable telephone comprises microstrip antennas for signal reception and signal transmission having adjacent resonance frequencies different from each other and approximately arranged on the same plane at a predetermined interval; and a switch circuit arranged between the first microstrip antenna, the second microstrip antenna, a signal receiving section and a signal transmitting section such that the first microstrip antenna is connected to the signal receiving section at a signal receiving time, and the second microstrip antenna is connected to the signal transmitting section at a signal transmitting time, and the first and second microstrip antennas are selectively connected to the signal receiving section at a diversity signal receiving time. This switch circuit is constructed such that first, second, third and fourth switches are sequentially inserted onto respective sides of the lead wire of a square; the first microstrip antenna is connected to a connection middle point of the first and second switches; the second microstrip antenna is connected to a connection middle point of the third and fourth switches; a connection middle point of the second and third switches is connected to an input side of the signal receiving section; a connection middle point of the fourth and first switches is connected to an output side of the signal transmitting section; the strengths of receiving signals from the first and second microstrip antennas are compared with each other by separately turning on the second and third switches in a state in which both the fourth and first switches are turned off in a switching period of the signal transmission and the signal reception; and the first and second microstrip antennas are selected and are connected to the signal receiving section by controlling turning-on and turning-off operations of the first, second, third and fourth switches on the basis of compared results of the strengths of the receiving signals in the next signal receiving period. Accordingly, it is possible to obtain a portable telephone having a switch circuit in which no antenna becomes a hindrance in storing of the portable telephone into a pocket of a coat, etc., and it is not necessary to extend the antenna at a signal reaching time and a calling time and shorten the antenna after an operator speaks by telephone. Further, in this portable telephone, the two antennas are switched and connected to the signal transmitting section and the signal receiving section so that normal signal reception and transmission and diversity signal reception are enabled by using these two antennas.

In accordance with the present invention, a portable telephone comprises microstrip antennas for signal reception and signal transmission having adjacent resonance frequencies different from each other and approximately arranged on the same plane at a predetermined interval. The portable telephone is constructed such that the first microstrip antenna is connected to a signal receiving section at a signal receiving time; the second microstrip antenna is connected to a signal transmitting section at a signal transmitting time; and the first and second microstrip antennas are selectively connected to the signal receiving section at a diversity signal receiving time. Accordingly, it is possible to obtain a portable telephone in which no antenna becomes a hindrance in storing of the portable telephone into a pocket of a coat, etc., and it is not necessary to extend the antenna at a signal reaching time and a calling time and shorten the antenna after an operator speaks by telephone. Further, in this portable telephone, the two antennas are switched and connected to the signal transmitting section and the signal receiving section so that normal signal reception and transmission and diversity signal reception are enabled by using these two antennas.

In accordance with the present invention, a portable telephone comprises microstrip antennas for signal reception and signal transmission having adjacent resonance frequencies different from each other and approximately arranged on the same plane at a predetermined interval. The portable telephone is constructed such that the first microstrip antenna is connected to a signal receiving section at a signal receiving time; the second microstrip antenna is connected to a signal transmitting section at a signal transmitting time; and the first and second microstrip antennas are connected to first and second signal receiving sections constituting the signal receiving section at a diversity signal receiving time, and outputs of the first and second signal receiving sections are selectively switched. Accordingly, it is possible to obtain a portable telephone in which no antenna becomes a hindrance in storing of the portable telephone into a pocket of a coat, etc., and it is not necessary to extend the antenna at a signal reaching time and a calling time and shorten the antenna after an operator speaks by telephone. Further, in this portable telephone, the two antennas are switched and connected to the signal transmitting section and the signal receiving section so that normal signal reception and transmission and diversity signal reception are enabled by using these two antennas.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A portable telephone for communication with a remote portion of a telephone system, the portable telephone comprising:

a first microstrip antenna for signal reception and a second microstrip antenna for signal transmission having adjacent resonance frequencies different from each other, wherein said first and second microstrip antennas are placed on substantially the same plane at a predetermined spacing, and wherein said spacing is greater than one quarter of the wavelength of the lower of the adjacent resonant frequencies;

a signal receiving section;

a signal transmitting section;

a switch circuit arranged between said first microstrip antenna and said second microstrip antenna, wherein said first microstrip antenna is connected to said signal receiving section at a signal receiving time, and wherein said second microstrip antenna is connected to said signal transmitting section at a signal transmitting time, and wherein said first and said second microstrip antennas are selectively connected to said signal receiving section at a diversity signal receiving time, and wherein said switch circuit includes a plurality of switches inserted onto respective sides of a lead wire formed in a polygon shape having an even number of sides, and wherein said first and said second microstrip antennas are switched by controlling a turning-on and a turning-off operation of said plurality of switches of said switch circuit.

2. A portable telephone comprising:

a first microstrip antenna for signal reception and a second microstrip antenna for signal transmission having adjacent resonance frequencies different from each other, wherein said first and second microstrip antennas are placed on substantially the same plane at a predetermined spacing;

a signal receiving section;

a signal transmitting section; and a switch circuit arranged between said first microstrip antenna and said second microstrip antenna, wherein said first microstrip antenna is connected to said signal receiving section at a signal receiving time, and wherein said second microstrip antenna is connected to said signal transmitting section at a signal transmitting time, and wherein said first and said second microstrip antennas are selectively connected to said signal receiving section at a diversity signal receiving time, wherein said switch circuit includes first, second, third and fourth switches sequentially inserted onto respective sides of a lead wire formed in a square shape, and wherein said first microstrip antenna is connected to a connection between said first and second switches, said second microstrip antenna is connected to a connection between said third and fourth switches, a connection between said second and third switches is connected to an input side of said signal receiving section, a connection between said fourth and first switches is connected to an output side of said signal transmitting section, and wherein strengths of signals received by said first and said second microstrip antennas are compared for providing a compared result by separately turning on said second and third switches in a state in which both said fourth and said first switches are turned off in a switching period of the signal transmission and the signal reception, and wherein said first and said second microstrip antennas are selected and connected to said signal receiving section by controlling a turning-on and a turning-off operation of said first, said second, said third and said fourth switches on the basis of said compared result of the strengths of the received signals in a next signal receiving period.

* * * * *